June 5, 1934.  E. W. DAVIS  1,961,477
LUBRICATOR FOR PNEUMATIC TOOLS
Filed March 2, 1928

Inventor
Ernest W. Davis
By Williams, Bradbury, McCaleb & Hinkle
Atty's

Patented June 5, 1934

1,961,477

UNITED STATES PATENT OFFICE 1,961,477

LUBRICATOR FOR PNEUMATIC TOOLS

Ernest W. Davis, Oak Park, Ill., assignor to Alemite Corporation, a corporation of Delaware Application March 2, 1928, Serial No. 258,504

13 Claims. (Cl. 184—55)

My invention relates, generally, to lubricators for pneumatic tools and more particularly to an improved type of lubricator in which a measured quantity of oil may be injected into the air passages of the tool each time the tool is operated.

It is an object of my invention to provide an improved lubricator for pneumatic tools with means for supplying a predetermined charge of lubricant to the tool every time it is operated.

A further object is to provide an improved lubricator having means for easily adjusting the rate at which lubricant is supplied to the tool.

A further object is to provide a lubricator which is simple in construction, may be economically manufactured, and which is compact and automatically operable.

Figure 1:
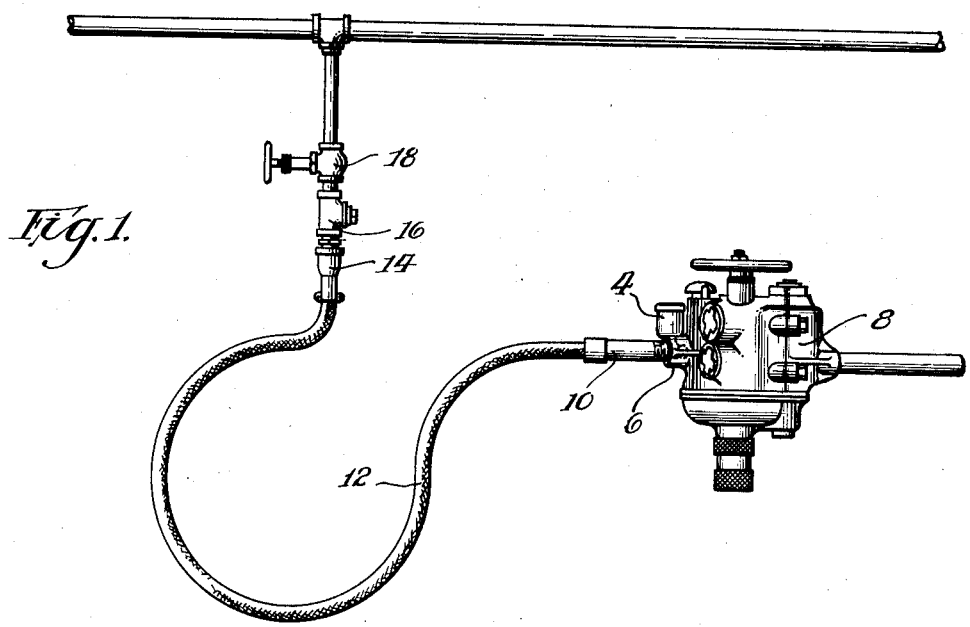
Figure 2:
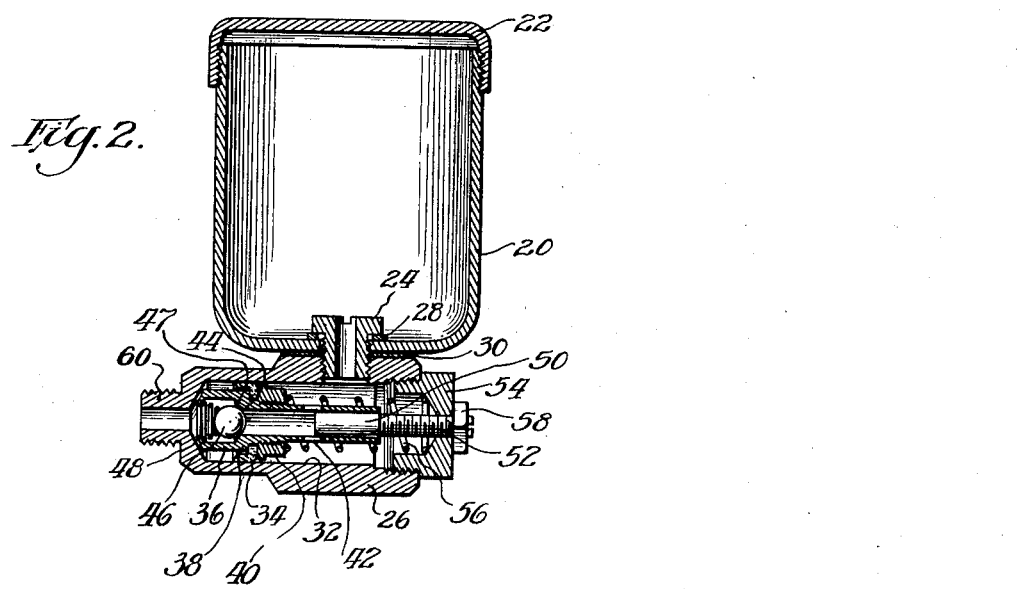

Other objects of the invention will appear from the following description, reference being had to the accompanying drawing, in which Fig. 1 illustrates a pneumatic drill having the lubricator of my invention installed thereon; and Fig. 2 is a central, vertical, cross sectional view of my improved lubricator.

It is very desirable, if not necessary, to provide some means for supplying small quantities of lubricant, preferably oil, to the motors of pneumatic tools. This can usually best be accomplished by supplying a small amount of oil to the compressed air as it enters the tool, the compressed air serving as a carrier to conduct the lubricant to pistons, cylinders and other parts of the tool subject to frictional wear. Many expedients have been proposed to accomplish this result, but most of them have been found inefficient or impractical due to the fact that the devices employed are delicate in construction and small particles of dirt or foreign matter clog and render them unserviceable. Furthermore, the rate of feed of oil in the lubricators at present generally used is uncertain and at times too little and at other times too much oil is fed to the tool. The method sometimes used is that of continuously supplying oil to the main compressed air line but in using this method the oil coming in contact with the rubber hoses tends to rot and deteriorate them.

The lubricator of my invention is adapted to supply an adjustable predetermined quantity of lubricant to the compressed air as it is supplied to the motor of the tool, every time the motor is started. The lubricator is preferably installed upon the tool itself between the air controlling valve and the motor of the tool.

As shown in Fig. 1 of the drawing, the lubricator 4 is secured to the passageway 6 through which the compressed air is supplied to the tool 8, which is here illustrated as a compressed air-operated drill. A valve handle 10 controls the supply of compressed air to the passageway 6 and is connected to an air supply line 16 by a suitable flexible hose 12 and a quick detachable coupling 14. A valve 18 is provided to shut off the supply of compressed air to the tool in the event it is desired to disconnect the tool or the hose 12 from the line.

The lubricator 4 comprises a pressed steel reservoir 20 having a suitable cap 22 threaded over the top and is secured by an axially drilled screw 24 to the cylinder body 26, suitable gaskets 28 and 30 being interposed between the bottom of the reservoir 20, the head of screw 24 and the body 26, respectively. The body 26 has a chamber 32 which forms a cylinder for a cup leather piston 34, which is secured upon a reciprocable sleeve 36, being held against a shoulder 38 thereof by a nut 40. The sleeve 36 has a pair of radial inlet ports 42 and an outlet port 44 which is normally closed by a ball valve 46, the latter being held against an outlet port valve seat 47 by a spring 48. A plunger 50 has a threaded stem 52 which is screwed into a plug 54, the plug being threaded in the end of the body 26. The sleeve 36 is slidable relative to the plunger 50 but is resiliently held in its outermost position by a coil spring 56, one end of which abuts against the nut 40 and the other end of which rests in a recess formed in the plug 54. The distance that the plunger 50 projects into the sleeve 36 may be adjusted by screwing the stem 52 into or out of the plug 54 a greater or lesser distance. The stem is held in adjusted position by a lock nut 58. The body 26 has a screw threaded end portion 60 by which the lubricator may be connected to a suitable pipe fitting in the compressed air supply passageway of the tool, or threaded directly into the housing casting of the air motor at its air inlet passageway.

In operation, the reservoir 20 is filled with lubricant and, as above stated, the lubricator attached to the pneumatic tool preferably at a position intermediate the motor of the tool and its air control valve. Whenever the valve is opened to admit compressed air to the tool motor the air pressure will be exerted upon the piston 34 and move the sleeve 36 to the right until the inlet ports 42 are closed by the plunger 50 when the lubricant in the sleeve 36 will be placed under pressure and forced past the check valve 46 and a portion thereof will flow into the air passageway of the tool. As long as the tool is operated, and the air pressure is sufficiently high, the sleeve will be held in its right-hand position by the air pressure, with its right-hand end abutting against the plug 54. As the pressure diminishes or upon a fluctuation of the pressure the sleeve 36, due to spring 56, will be returned to its left-most position and an increase of pressure will again force the sleeve to the right, thereby discharging lubricant into the air line. However, when the air valve of the tool is closed, the spring 56 will return the sleeve 36 to its left-most or normal position as indicated in Fig. 2, forcing that lubricant which has been ejected past the valve into the air passageway of the tool. Inasmuch as the stroke of the sleeve 36 is invariable, the quantity of oil forced into the air line each time the air valve is turned on and off, may be regulated by adjusting the position of the plunger 50. That is, by screwing the stem 52 to the right (Fig. 2), the quantity of oil supplied at each operation of the tool may be decreased and by screwing it into the body (to the left), the quantity of oil discharged will be increased. Thus, the lubricator may be adjusted for the requirements of the particular tool to which it is applied.

It will be understood that, although I have shown the lubricator as attached directly to the tool, it may be attached directly below the shut off valve 18 when, for some reason, it is not desirable to attach it to the pneumatic tool or machine, but it is preferable to connect it as shown to prevent deterioration of the rubber of the hose by the oil. It will also be obvious that the lubricator may be used to supply oil to a great variety of fluid-operated tools. If, instead of having the chamber 32 positioned horizontally, it be constructed so as to be vertical, all of the oil ejected from the sleeve 36 as the air is turned on could immediately flow by gravity into the air passageway of the tool, which may be desirable when the lubricator is used on certain types of pneumatically-operated machines.

While I have shown and described a particular embodiment of my invention, it will be clear to those skilled in the art that various modifications thereof may be made without departure from the underlying principles of its construction. I therefore desire the scope of my invention to be limited only by the claims which follow.

I claim:

1. In a lubricator of the class described, the combination of a reservoir, a body having a cylindrical chamber in communication with said reservoir, means on said body for making a connection with a pneumatic tool air supply passageway, a ported sleeve reciprocable within said chamber, a piston element secured around said sleeve and engaging the walls of said chamber, a spring tending to hold said sleeve and piston at one end of said chamber, a check valve normally closing one end of said sleeve, a plunger adjustable in said body and projecting into the other end of said sleeve, and means for locking said plunger in adjusted position.

2. In a lubricator of the class described, a body having a cylindrical chamber, means to supply lubricant thereto, means on said body for connecting said chamber to a passageway having a fluid of fluctuating pressure therein, and pumping means in said chamber actuated by fluctuations of the pressure of said fluid for ejecting predetermined quantities of lubricant from said chamber to said passageway, upon each complete cycle of operation of said pumping means.

3. In a lubricator of the class described, the combination of a source of lubricant, a body adapted to be connected to a fluid passageway having a fluctuating pressure and having a chamber connected to said source, and cylinder and plunger pumping means in said body operated by fluctuations in the pressure in said passageway for forcing lubricant from said source into said passageway.

4. In a lubricator of the class described, the combination of a relatively stationary plunger, a sleeve slidable over said plunger, a check valve normally closing the end of said sleeve opposite said plunger, means for sliding said sleeve over said plunger upon a predetermined increase in pressure at one end of said sleeve, means for supplying lubricant to the interior of said sleeve, and resilient means for resisting said sliding movement of said sleeve, whereby said sleeve will reciprocate upon pressure variations at said end of said sleeve and lubricant will be trapped in said sleeve and forced past the outlet check valve thereof by said plunger.

5. In a lubricator of the class described, the combination of a lubricant reservoir, a body having a chamber in communication with said reservoir, means on said body for making a connection with a fluid supply passageway, a sleeve reciprocable within said chamber, a piston element secured to said sleeve and engaging the walls of said chamber, a spring tending to hold said sleeve and piston at one end of said chamber, a plunger carried in said body and projecting into the end of said sleeve, and means for adjusting the position of said plunger with respect to said body.

6. In a lubricator of the class described, a body having a cylindrical chamber, means to supply lubricant thereto, means on said body for connecting said chamber to a passageway having a fluid of fluctuating pressure therein, and adjustable effective stroke pumping means in said chamber actuated by fluctuations of the pressure of said fluid for ejecting lubricant from said chamber to said passageway.

7. In a lubricator of the class described, the combination of a reservoir, a body having a cylindrical chamber in communication with and positioned transversely with respect to said reservoir, means on said body for making a connection with a pneumatic tool air supply passageway, a ported sleeve reciprocable within said chamber, a cup leather secured to said sleeve and engaging the walls of said chamber, a spring tending to hold said sleeve and cup leather at one end of said chamber, a spring-pressed ball check valve normally closing one end of said sleeve, a plunger projecting into the other end of said sleeve and having a stem adjustably secured in said body, and means for locking said plunger in adjusted position.

8. In a lubricator of the class described, the combination of a cylinder, a piston reciprocable therein, a spring tending normally to hold said piston in one end of said cylinder, a ported sleeve carried by said piston, a plunger secured to said cylinder and fitting in one end of said sleeve, and a spring-pressed check valve closing the other end of said sleeve.

9. In a device of the class described, the combination of a source of lubricant, a chamber having one end communicating with said source, means for connecting the other end of said chamber to a pneumatic tool air supply line, a piston in said chamber, and movable cylinder means controlled by the variations in pressure in said supply line and operably associated with said piston for forcing lubricant into said supply line at a pressure greater than the air pressure therein.

10. In a lubricator of the class described, the combination of a cylinder, a piston in said cylinder, a source of lubricant communicating with one end of said cylinder, means for connecting the other end of said cylinder to an air passageway of a pneumatic tool to be lubricated, and means operably associated with said piston to force lubricant from one end of said cylinder to the other by the air pressure upon a predetermined increase of the air pressure in said passageway.

11. In a lubricator of the class described, the combination of a body having a chamber therein, an inlet and an outlet port associated with said chamber, a source of lubricant, a fluid passageway having a fluctuating pressure, said ports adapted to connect opposite ends of said chamber with said source and with said passageway respectively, a pumping mechanism reciprocably mounted within said chamber interposed between said ports, and adjustable means associated with said pumping mechanism for conditioning the latter to eject a predetermined quantity of lubricant into said passageway upon actuation of said pumping mechanism by a predetermined pressure in said passageway.

12. In a lubricator of the class described, a body having a cylindrical chamber, means to supply lubricant thereto, means on said body for connecting said chamber to a passageway having a fluid of fluctuating pressure therein, and adjustable pumping means operable to eject a measured charge of lubricant from said chamber only when the pressure in said passageway attains a predetermined maximum.

13. In a device of the class described, the combination with an air supply line for a pneumatically operated tool of a body member secured thereto and having a chamber therein, a movable wall in said chamber, a source of lubricant communicating with said chamber, and a pumping mechanism associated with said movable wall and adapted to cooperate with said wall upon movement thereof to force a predetermined quantity of lubricant from said source into said air supply line.

ERNEST W. DAVIS.